(12) United States Patent
Gitlin et al.

(10) Patent No.: US 9,826,541 B1
(45) Date of Patent: Nov. 21, 2017

(54) SYSTEM AND METHOD FOR USER-SPECIFIC QUALITY OF SERVICE SCHEDULING IN WIRELESS SYSTEMS

(71) Applicants: Richard Dennis Gitlin, Tampa, FL (US); Zygmunt J. Haas, Richardson, TX (US); Huseyin Arslan, Tampa, FL (US); Gabriel Eduardo Arrobo, Emeryville, CA (US); Chao He, Tampa, FL (US)

(72) Inventors: Richard Dennis Gitlin, Tampa, FL (US); Zygmunt J. Haas, Richardson, TX (US); Huseyin Arslan, Tampa, FL (US); Gabriel Eduardo Arrobo, Emeryville, CA (US); Chao He, Tampa, FL (US)

(73) Assignees: University of South Florida, Tampa, FL (US); Cornell University, Ithaca, NY (US)

( * ) Notice: Subject to any disclaimer, the term of this patent is extended or adjusted under 35 U.S.C. 154(b) by 13 days.

(21) Appl. No.: 14/755,841

(22) Filed: Jun. 30, 2015

Related U.S. Application Data

(60) Provisional application No. 62/038,868, filed on Aug. 19, 2014.

(51) Int. Cl.
| H04W 72/04 | (2009.01) |
| H04W 72/12 | (2009.01) |
| H04W 24/02 | (2009.01) |
| H04W 88/02 | (2009.01) |

(52) U.S. Cl.
CPC ....... *H04W 72/1236* (2013.01); *H04W 24/02* (2013.01); *H04W 88/02* (2013.01)

(58) Field of Classification Search
None
See application file for complete search history.

(56) References Cited

U.S. PATENT DOCUMENTS

| 8,284,660 B2 | 10/2012 | Ulupinar et al. |
| 8,665,881 B2 | 3/2014 | Lee et al. |
| 8,761,095 B1 | 6/2014 | O'Brien |
| 2009/0147684 A1* | 6/2009 | Majidi-Ahy ............ H04L 12/66 370/236 |

(Continued)

FOREIGN PATENT DOCUMENTS

WO    2014092972 A1    6/2014

OTHER PUBLICATIONS

Ekstrom. QoS control in the 3GPP evolved packet system. IEEE Commun. Mag. 2009. vol. 47: 76-83 (2009).

(Continued)

*Primary Examiner* — Brandon Renner
(74) *Attorney, Agent, or Firm* — Molly L. Sauter; Smith & Hopen, P.A.

(57) ABSTRACT

The present invention provides a novel rate adaptation algorithm and QoS-aware MAC scheduling system and method that either maximizes user satisfaction or maximizes spectrum utilization while maintaining user satisfaction by trading off the spectral resource allocations of connections for the application-level QoS based on the user-specific requirements. An adaptive scheduler is presented that incorporates user specific QoS requirements in the spectral allocation of resources.

15 Claims, 11 Drawing Sheets

(56) References Cited

U.S. PATENT DOCUMENTS

| | | | |
|---|---|---|---|
| 2009/0175226 A1* | 7/2009 | Ren | H04L 25/0226 370/329 |
| 2009/0245213 A1 | 10/2009 | Zaki et al. | |
| 2010/0027431 A1* | 2/2010 | Morrison | H04L 41/0681 370/252 |
| 2011/0228750 A1* | 9/2011 | Tomici | H04W 8/082 370/338 |
| 2012/0051299 A1* | 3/2012 | Thakolsri | H04W 28/22 370/329 |
| 2012/0066309 A1* | 3/2012 | Yuki | G06F 17/30265 709/204 |
| 2012/0093070 A1* | 4/2012 | Huang | H04B 7/2606 370/315 |
| 2014/0341109 A1* | 11/2014 | Cartmell | H04L 45/308 370/328 |
| 2015/0103846 A1* | 4/2015 | Dung Dao | H04L 47/2416 370/437 |
| 2015/0146554 A1* | 5/2015 | Bali | H04W 24/08 370/252 |

OTHER PUBLICATIONS

Ergen et al., QoS aware adaptive resource allocation techniques for fair scheduling in OFDMA based broadband wireless access systems. IEEE Transactions on Broadcasting. 2003. vol. 49 (No. 4): 362-370.

Pearson et al., Gender differences in a longitudinal study of age—associated hearing loss. J. Acoust. Soc. Am. 1995. vol. 97 (No. 2): 1196-1205.

Khan et al., MOS-Based Multiuser Multiapplication Cross-Layer Optimization for Mobile Multimedia Communication. Adv. Multimed. 2007. Article ID: 94918: 1-11.

Saul et al., Cross-Layer Optimization With Model-Based Parameter Exchange. Presented at the Communications. IEEE International Conference on ICC '07: 1-7.

Thakolsri et al., QoE-Driven Cross-Layer Optimization for High Speed Downlink Packet Access. J. Commun. 2009. vol. 4 (No. 9): 669-680.

Saul and Auer. Multiuser Resource Allocation Maximizing the Perceived Quality. EURASIP J. Wireless Commun. Netw. 2009. Article ID: 341689: 1-15.

Kela et al., Dynamic packet scheduling performance in UTRA Long Term Evolution downlink. 3rd International Symposium on Wireless Pervasive Computing (ISWPC). 2008: 318-313 (2008).

Beh et al., Joint Time-Frequency Domain Proportional Fair Scheduler with HARQ for 3GPP LTE Systems. IEEE 68th Vehicular Technology Conference (VTC). 2008: 1-5.

Mertz and Vary. Efficient Voice Communication in Wireless Packet Networks. 2008 ITG Conference on Voice Communication (SprachKommunikation). pp. 1-4 (2008).

Fitzpatrick. An E-Model based adaptation algorithm for AMR voice calls. Wireless Days (WD). 2011 IFIP: 1-6.

Cole and Rosenbluth. Voice over IP Performance Monitoring. ACM SIGCOMM Comput Commun Rev. 2001. vol. 31: 9-24.

* cited by examiner

TABLE I. USER-SPECIFIC SDP MEDIA TYPE DEFINITION

| User-specific QoS | Media Type |
|---|---|
| Audio (low sensitivity factor) | 100 (0 + 100) |
| Audio (normal sensitivity factor) | 0 |
| Audio (high sensitivity factor) | 200 (0 + 200) |

Fig. 8

TABLE II. MAPPING FROM USER-SPECIFIC QoS TO QCI

| User-specific QoS | QCI |
|---|---|
| Voice (low sensitivity factor) | 101 (1 + 100) |
| Voice (normal sensitivity factor) | 1 |
| Voice (high sensitivity factor) | 201 (1 + 200) |

Fig. 9

TABLE III. SYSTEM SIMULATION CONFIGURATION

| Parameter | Assumption |
|---|---|
| Cellular layout | 1 macrocell |
| Cell radius | 1 kilometer |
| Path loss model | 3GPP suburban macrocell |
| Mobility model | Random Way Point (30/60 km/h) |
| Carrier frequency | Uplink:1920MHz<br>Downlink:2110MHz |
| System bandwidth | 10MHz |
| Channel model | ITU Vehicle A |
| Total BS TX power | 40dBm |
| UE power | 23dBm |
| VoIP codec modes | AMR12.2K, AMR10.2K, AMR7.95K |
| Number of users | 54 VoIP users |
| Scheduler | Dynamic scheduling<br>USQA-M, USQA-MC scheduler<br>and Baseline scheduler |
| Other assumptions | Ideal uplink receiver<br>(no block error and packet loss) |

Fig. 10

TABLE IV. SYSTEM SIMULATION CASES

| Cases | Assumption | USQA scheduler |
|---|---|---|
| Case 1 | 54 VoIP users (18 users' $\alpha = 0.8$, 18 users' $\alpha = 1.0$, 18 users' $\alpha = 1.2$), 30 km/h. | USQA-M scheduler |
| Case 2 | Same as Case 1. | USQA-MC scheduler |
| Case 3 | 54 VoIP users ($\alpha = 0.8$), 30 km/h. | USQA-MC scheduler |
| Case 4 | 54 VoIP users ($\alpha = 0.8$), 60 km/h. | USQA-MC scheduler |

Fig. 11

TABLE V. AVERAGE MOS VALUE

| Cases | Scheduler | User category | MOS | MOS improvement |
|---|---|---|---|---|
| Case 1 | USQA-M | User(1.2) | 3.86 | 9% |
| | | User(1.0) | 3.84 | -1% |
| | | User(0.8) | 3.87 | -2% |
| | Baseline | User(1.2) | 3.54 | N/A |
| | | User(1.0) | 3.88 | N/A |
| | | User(0.8) | 3.95 | N/A |
| Case 2 | USQA-MC | User(1.2) | 3.75 | 6% |
| | | User(1.0) | 3.83 | -1.3% |
| | | User(0.8) | 3.90 | -1.3% |
| | Baseline | User(1.2) | 3.54 | N/A |
| | | User(1.0) | 3.88 | N/A |
| | | User(0.8) | 3.95 | N/A |

Fig. 12

TABLE VI. SYSTEM CAPACITY COMPARISON

| Cases | Scheduler | VoIP MAC throughput (Mbps) | Capacity improvement |
|---|---|---|---|
| Case 2 | USQA-MC | 1.000 | 4.5% |
| | Baseline | 1.045 | N/A |

SYSTEM AND METHOD FOR USER-SPECIFIC QUALITY OF SERVICE SCHEDULING IN WIRELESS SYSTEMS

CROSS-REFERENCE TO RELATED APPLICATIONS

This application claims priority to U.S. Provisional Patent Application No. 62/038,868, entitled, "System and Method for User-Specific Quality of Service Scheduling in Wireless Systems", filed on Aug. 19, 2014, which is hereby incorporated by reference in its entirety.

STATEMENT OF GOVERNMENT INTEREST

This invention was made with government support under Grant Number 1352883 awarded by the National Science Foundation. The government has certain rights in the invention.

BACKGROUND OF THE INVENTION

In today's wireless 4G LTE networks, the spectral allocation of network resources is independent of the Quality of Service (QoS) requirements of the specific application and/or independent of the users' specific perceived QoS, or at most, relies on a set of pre-defined fixed priorities. Although in these standards, the media access control (MAC) and physical (PHY) layers have an increased role in optimizing the usage of the spectral resources and implementing link quality-aware techniques, optimization is still largely independent of the application content, the users' requirements and the user's perception of performance degradation. The allocation of resources does not take into account the QoS required by different applications and their users, beyond simply assigning fixed priorities to traffic classes. Indeed, from the user's perspective, the QoS required by different applications can be quite variable. Similarly, for a given application type, different users may require different levels of QoS.

For example, in Voice over IP (VoIP) applications, the perceived voice quality of different languages may differ substantially when allocated the same data rate and Bit Error Rate (BER), as a result of the different spectral content of the various languages and because of a particular user's auditory spectral response (with variations typically due to aging), making the user more or less sensitive to a particular type of distortion. Consequently, the same amount of degradation, as experienced by specific applications and the users of the applications, may have substantially different perceptual effects. Various conversation environments may also require a different quality of service for different users, wherein some users may be having a conversation under very noisy conditions, while other users may be conversing under very quiet conditions, thus making users more or less sensitive to packet losses depending upon the conversation environment. If the same spectral resources are allocated to users in very noisy conditions and very quiet conditions, then very different user experiences will likely be observed. As another example, considering that people from different age groups normally have varying sensitivity to high frequency content, this variability can be exploited to maximize the system capacity by reducing the bit rate for users with reduced frequency sensitivity.

For video applications, as a user-specific QoS example, older individuals are less sensitive to spatial form defined by temporal structure, as compared to younger adults. So, for many older people, a lower video data rate provides the same user experience as the full rate video does for younger people. As another user-specific QoS example, to achieve the same user experience for different video content (e.g. news and sports video), the required video data rate can be quite different. The required data rate of news video can be much less than that of sports video.

Accordingly, there is a need in the art for a system and method that utilizes the user-specific QoS requirements and a scheduler to differentiate the users and to make better use of the wireless spectral resources, thereby maximizing spectrum utilization while maintaining user satisfaction.

SUMMARY OF INVENTION

The present invention provides a novel system implementing a rate adaptation algorithm and QoS (quality-of-service) aware MAC (media access control) scheduling algorithm that is effective in either maximizing user satisfaction or maximizing spectrum utilization while maintaining user satisfaction by trading off the spectral resource allocations of connections for the application-level QoS based on the user-specific requirements.

In accordance with the invention, user-specific QoS requirements can be incorporated through scheduling to improve spectral utilization for wireless systems. Based on the user-specific requirements, depending upon whether the target is maximizing user satisfaction (i.e., the Quality of Service) or system capacity (i.e., the number of supportable users), the scheduling can either maximize spectrum utilization and maintain user satisfaction by trading off the spectral resource allocations for the application-level QoS, or maximize user satisfaction, as measured by the user specific Mean Opinion Score (MOS), by giving differentiated scheduling priorities to users with different QoS requirements. The user-specific QoS applications include but not are limited to voice applications and video applications.

In accordance with one embodiment of the invention, a method for user-specific quality of service (QoS) aware media access control (MAC) resource scheduling is provided. The method includes, identifying one or more user-specific QoS sensitivity factors of a user associated with a user equipment and determining, at a MAC scheduler, a MAC resource scheduling priority for the user equipment based upon the one or more user-specific QoS sensitivity factors of the user. The method improves user satisfaction by dynamically adapting the MAC scheduling algorithm to user-specific QoS requirements to differentiate users' scheduling priorities, thereby maximizing user satisfaction.

In an additional embodiment, the may further include, determining a data rate for the user equipment based upon the one or more user-specific QoS sensitivity factors of the user. The method include the determination of a data rate for the user equipment, improves the system capacity, by dynamically adapting the data rate and MAC scheduling algorithms to the user-specific QoS requirements, thereby maximizing the system capacity while continuing to maintain user satisfaction at a comparable level.

To accommodate the changing channel conditions, the method may further include, dynamically adjusting the MAC resource scheduling priority and the data rate for the user equipment based upon the channel environment for the user equipment and a network condition of the MAC scheduler.

In an additional embodiment, an apparatus is provided that is configured for operation in a wireless communication network. The apparatus includes, a memory and at least one processor coupled to the memory, the at least one processor being configured to identify one or more user-specific QoS sensitivity factors of a user associated with a user equipment of the wireless communication network and to determine a MAC resource scheduling priority for the user equipment based upon the one or more user-specific QoS sensitivity factors of the user. The processor may further be configured to determine a data rate for the user equipment based upon the one or more user-specific QoS sensitivity factors of the user.

In an additional embodiment, a computer program product configured for wireless communication is provided. The computer program product includes, a computer-readable medium having non-transitory program code recorded thereon, the program code comprising, program code to identify one or more user-specific QoS sensitivity factors of a user associated with a user equipment of the wireless communication network and program code to determine a MAC resource scheduling priority for the user equipment based upon the one or more user-specific QoS sensitivity factors of the user. The program code may further include, program code to determine a data rate for the user equipment based upon the one or more user-specific QoS sensitivity factors of the user.

Accordingly, the present invention provides a system and method that utilizes the user-specific QoS requirements and a scheduler to differentiate the users and to make better use of the wireless spectral resources, thereby maximizing spectrum utilization while maintaining user satisfaction.

BRIEF DESCRIPTION OF THE DRAWINGS

For a fuller understanding of the invention, reference should be made to the following detailed description, taken in connection with the accompanying drawings, in which:

FIG. 8 is a table illustrating user-specific SDP media type definitions, in accordance with an embodiment of the invention.

FIG. 9 is a table illustrating the mapping from the user-specific QoS to QCI, in accordance with an embodiment of the invention.

FIG. 10 is a table illustrating the system simulation configuration, in accordance with an embodiment of the invention.

FIG. 11 is a table illustrating the system simulation cases, in accordance with an embodiment of the invention.

FIG. 12 is a table illustrating the average MOS values, in accordance with an embodiment of the invention.

DETAILED DESCRIPTION OF THE PREFERRED EMBODIMENT

Figure 1:
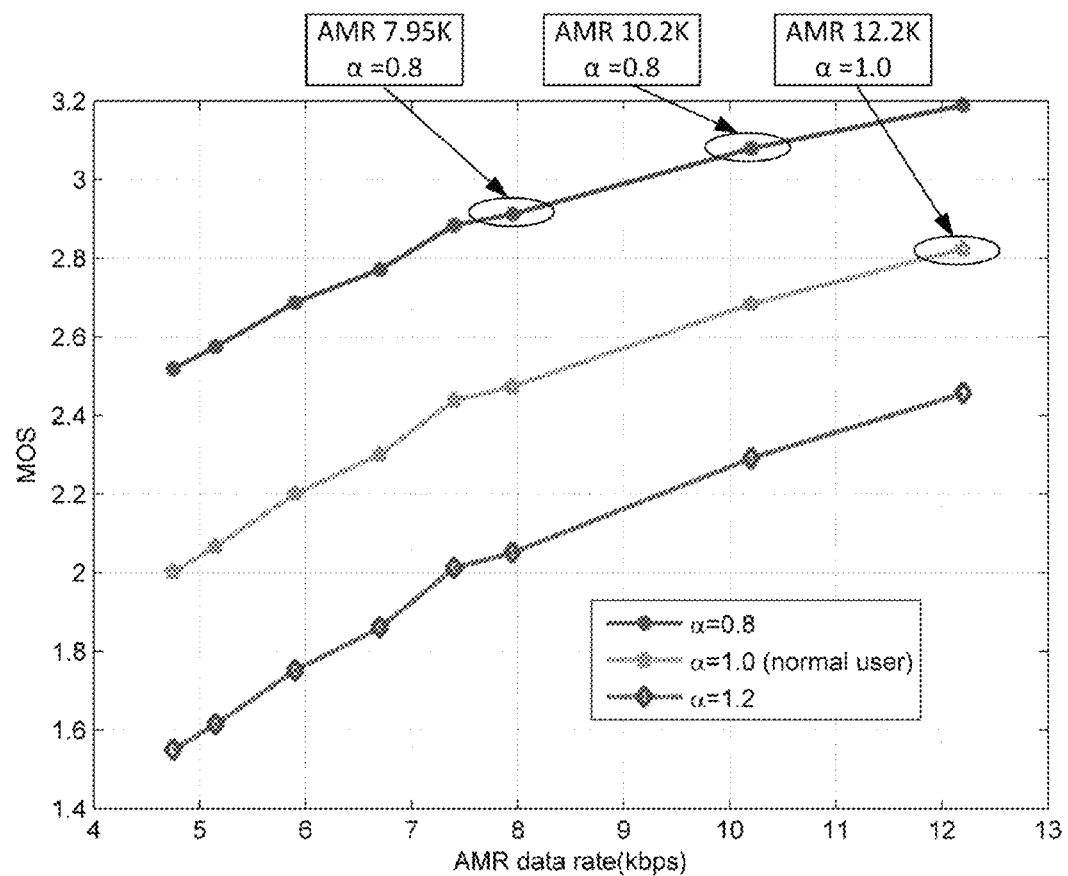
FIG. 1 is a graphical illustration of the VoIP MOS as a function of AMR date rate given a packet loss ratio of 0.05 and an end-to-end delay of 150 ms, in accordance with an embodiment of the invention.

The MAC Scheduler is known in the art as a key component of the LTE Evolved NodeB (eNodeB). The function of the scheduler is to facilitate the allocation of the available spectral resources (e.g., time and frequency resources), while striving to satisfy the QoS requirement of all the users.

Two of the main functions of LTE radio scheduling are dynamic packet scheduling and link adaptation, where the scheduler needs the input of the link adaptation module to select the appropriate Modulation and Coding Scheme (MCS) for channel dependent scheduling. In dynamic packet scheduling, the time-frequency domain resources are distributed dynamically among the active users to get their packets scheduled at the MAC layer. The packet scheduling comprises two scheduling components, which are performed sequentially in each scheduling time unit, known as Transmission Time Interval (TTI) in LTE (TTI=1 ms). The first component is the time domain scheduler (TDS) and the second is the frequency domain scheduler (FDS). The objective of the time domain scheduler is to choose a subset of all users requesting frequency resources, while the objective of the frequency domain scheduler is to allocate physical resources for the candidate users provided by the time domain scheduler. Several basic scheduling algorithms exist both in time and frequency domains, including round-robin scheduling and maximum C/I (carrier-to-interference power ratio) scheduling.

In voice-over-IP (VoIP) applications, the Adaptive Multi-Rate (AMR) audio codec is an audio data compression scheme that is used in LTE and is optimized for speech coding. Adaptive Multi-Rate (AMR) audio consists of a multi-rate speech codec that encodes speech signals at variable bit rates ranging from 4.75 to 12.2 Kbits/s. In telecommunications, the mean opinion score (MOS) is a test that has been used for decades to obtain the human user's view of the quality of the network. The MOS provides a numerical indication of the perceived quality from the users' perspective of received audio after compression and/or transmission. The MOS is expressed as a single number ranging between 1 and 5, wherein 1 is the lowest and 5 is the highest perceived audio quality measurement. The computation of the Mean Opinion Score (MOS) may be defined as follows:

$$R = R_0 - I_d - I_{eff} \quad (1)$$

where R is the transmission rating factor, which combines all transmission parameters relevant for the considered connection. $R_0$ is the basic signal-to-noise ratio which has a default value of 93.2, $I_d$ represents the impairments due to delay, which is the same for all the codec modes, and $I_{eff}$ represents the effect of packet losses and depends on the codec (e.g. AMR, G.711) that is used. $I_d$ is calculated as:

$$I_d = 0.024d + 0.11(d - 177.3)U(d - 177.3) \quad (2)$$

where d is the end-to-end delay in milliseconds and U is the unit step function.

For AMR codecs, the $I_{eff}$ is given by:

$$I_{eff} = I_e + (95 - I_e)\left(\frac{100P_{pl}}{\frac{100P_{pl}}{BurstR} + B_{pl}}\right) \quad (3)$$

where $P_{pl}$ represents packet loss ratio, BurstR is the average length of observed bursts in an arrival sequence to the average length of bursts expected for the network under "random" loss ratio. It is assumed that the packet loss is independent and hence, BurstR=1. $B_{pl}$ is the robustness factor which is set to 10 for all AMR codec modes. $I_e$ is defined for all AMR codec modes in, where eight AMR-NB codec modes are defined in LTE.

R is converted to MOS according to (4):

$$MOS = \begin{cases} 1, & \text{where } R < 0 \\ 1 + 0.035R + R(R - 60)(100 - R)7 \cdot 10^{-6}, & \text{when } R \in [0, 100] \\ 4.5, & \text{when } R > 100 \end{cases} \quad (4)$$

From (1)-(4), the lower the delay, or the lower the packet loss ratio, the higher the mean opinion score (MOS) value.

For video applications, a simplified video MOS model is assumed where the distortion, as measured by the Mean Square Error (MSE) is assumed to be composed of two additive components, namely the source distortion ($D_S$) and the loss distortion ($D_L$):

$$MSE = D_S + D_L = \eta \cdot R^\xi + \beta \cdot PEP \quad (5)$$

In (5), $\eta$, $\xi$, and $\beta$ are model parameters and PEP is the packet loss ratio. For different types of video sources, $\eta$, $\xi$, and $\beta$ take different values. For illustrative purposes we assume, $\eta = 1.76 \cdot 10^5$, $\xi = -0.658$, and $\beta = 1750$. The PSNR (Peak Signal-to-Noise Ratio) is a widely used objective measurement of video quality, and is related to the MSE by:

$$PSNR(dB) = 10 * \log_{10} \frac{255^2}{MSE} \quad (6)$$

A piecewise linear mapping from the PSNR to MOS is shown in (7):

$$MOS = \begin{cases} 1, & \text{when } PSNR < 20 \\ 1 + \frac{3.5}{20}(PSNR - 20) & \text{when } PSNR \in [20, 40] \\ 4.5, & \text{when } PSNR > 40 \end{cases} \quad (7)$$

From (5)-(7), the higher the data rate, or the lower the packet loss ratio, the higher the mean opinion score (MOS) value.

The novelty of the proposed system for rate adaptation and MAC scheduling algorithms and associated methodology is that user-specific QoS requirements are incorporated into the scheduling and individual user equipment (UE) scheduling is personalized utilizing the user-specific QoS information to improve system performance, as described below.

In one embodiment, the proposed scheduling method is composed of three parts, the determination of the adaptive multi-rate (AMR) mode adaptation, the determination of the video data rate adaptation and the determination of the MAC resource scheduling.

The MAC scheduling comprises two scheduling components that are performed sequentially in each scheduling time unit, which is known as Transmission Time Interval (TTI) in LTE (TTI=1 ms). The first component is the time domain scheduler (TDS) and the second component is the frequency domain scheduler (FDS). The objective of the time domain scheduler is to choose a subset of users requesting frequency resources, while the objective of frequency domain scheduler is to allocate physical resources for the candidate users provided by the time domain scheduler.

The benchmark for performance comparison is the LTE baseline scheduler that doesn't consider the user-specific QoS requirement, where the time domain and frequency domain schedulers function as follows. It is also easy to extend this approach to other baseline schedulers to do a fair comparison with and without user-specific QoS requirements.

Regarding the time domain scheduler, users with higher metrics (e.g., packet delay) can get higher scheduling priority and resources in the time domain. The packet delay metric for user k is defined as:

$$M_k = TW_k * \text{Delay of Packet} \quad (8)$$

where $TW_k = 1$ for all users, which means users are not differentiated by their specific QoS requirements. Delay of Packet is the packet delay in the MAC buffer.

Regarding the frequency domain scheduler, each user has a Carrier-to-Interference (C/I) metric for each sub-band and is sorted for each sub-band among all the scheduled users. A max C/I approach is used in the LTE baseline scheduler, where each sub-band is first allocated to the user that has the highest C/I, then to the user with the second and third highest C/I, and so on until all the resources of this given sub-band are allocated. The C/I metric for user k in each sub-band n is defined by:

$$M_{n,k} = FW_{n,k} * SINR_{n,k} \quad (9)$$

where $FW_{n,k} = 1$, which means users are not differentiated by their specific QoS requirements, and $SINR_{n,k}$ is the SINR for user k in sub-band n.

User equipment (UE) is considered to be any device used directly by an end user to communicate. Regarding the UE-specific VoIP determination, it is assumed that different people have similar sensitivity to the end-to-end delay for VoIP applications, so that only UE specific sensitivity to packet losses is studied. To reflect different users' sensitivity to packet losses, a user-specific packet loss sensitivity factor, "$\alpha$", is added to (1). Therefore, $$R = R_0 - I_d - \alpha \cdot I_{eff} \quad (10)$$

In this analysis, without loss of generality and also for simplicity of illustration, the user-specific packet-loss sensitivity factor $\alpha$ takes values from the following set $\{0.8, 1.0, 1.2\}$. The higher the value of the sensitivity factor ($\alpha$), the user is increasingly sensitive to packet loss. When $\alpha$ takes the value of 1, the user is considered to be a normal user. When $\alpha$ takes the value greater than 1, the user is considered to be more sensitive to packet losses when compared with a normal user. When $\alpha$ takes the value less than 1, the user is considered to be less sensitive to packet losses compared with a normal user. Correspondingly, users can be classified into 3 categories: users with higher (1.2), normal (1.0), and lower (0.8) sensitivity factors.

FIG. 1 shows the MOS as a function of different AMR data rates for different sensitivity factors α, given an end-to-end delay of 150 ms and packet loss ratio of 0.05. For a comparison between AMR 12.2K mode and α=1.0 with AMR 10.2K/7.95K mode and α=0.8, it is shown that users with AMR 10.2K/7.95K and α=0.8 may, under certain conditions, have a higher MOS than users with AMR 12.2K mode and α=1.0. If the scheduler can know, or adaptively learn, each user's application specific sensitivity factors, it can degrade the AMR mode for users with a lower sensitivity factor, while maintaining a comparable MOS as that of users with higher AMR mode but a normal sensitivity factor. With this approach, more users can be supported, thus achieving the target of improving system capacity.

Figure 2:
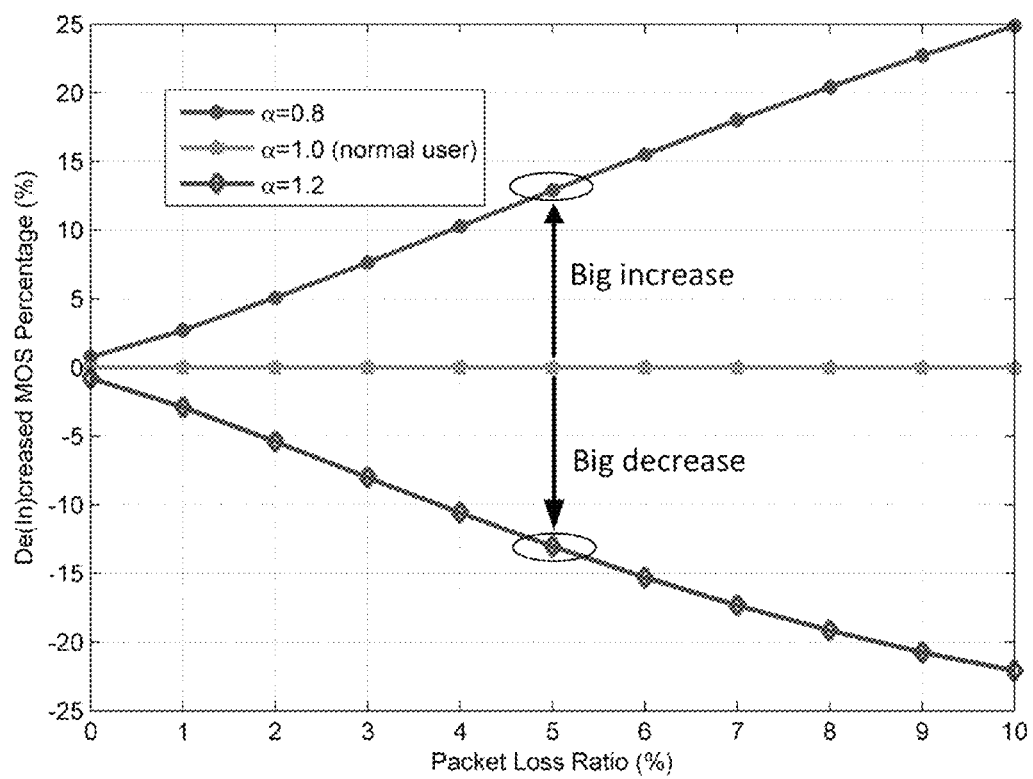
FIG. 2 is a graphical illustration of the decreased/increased MOS as a function of packet loss ration given an end-to-end delay of 150 ms and an AMR of 12.2K.

FIG. 2 illustrates the decreased, or increased, MOS percentage due to the different sensitivity factors for different users. As shown the MOS of VoIP users with a sensitivity factor of 1.2 is decreased by approximately 15%, whereas the MOS of VoIP users with a sensitivity factor of 0.8 is increased by approximately 15%, when a packet loss ratio of 5% and an end-to-end delay of 150 ms are assumed. Accordingly, as the packet loss ratio increases, the MOS will decrease or increase even more. As such, the MOS of VoIP users with a sensitivity factor of 1.2 needs to be improved to the corresponding MOS value with a sensitivity factor of 1.0, as illustrated with reference to FIG. 2.

One approach to decreasing the MOS of a subset of VoIP users having a sensitivity factor of 0.8 is to deprioritize the subset of users by giving the subset of users a lower scheduling priority in the MAC scheduler. In this approach, the MOS of users with α=1.2 will be increased, that is, given a higher scheduling priority, whereas users with α=1.0 have a normal scheduling priority, and the MOS of users with α=0.8 are decreased slightly and given a lower scheduling priority.

A second approach to decreasing the MOS of a subset of VoIP users having a sensitivity factor of 0.8 is to degrade the data rate (i.e. AMR mode) of the subset of users. In the second approach, the subset of users are scheduled as normal users in the MAC scheduler.

In this approach, the MOS of users with α=1.2 will be increased, that is, given a higher scheduling priority, whereas users with α=1.0 have a normal scheduling priority and users with α=0.8 are used to improve the capacity by degrading their AMR codec modes.

Figure 3:
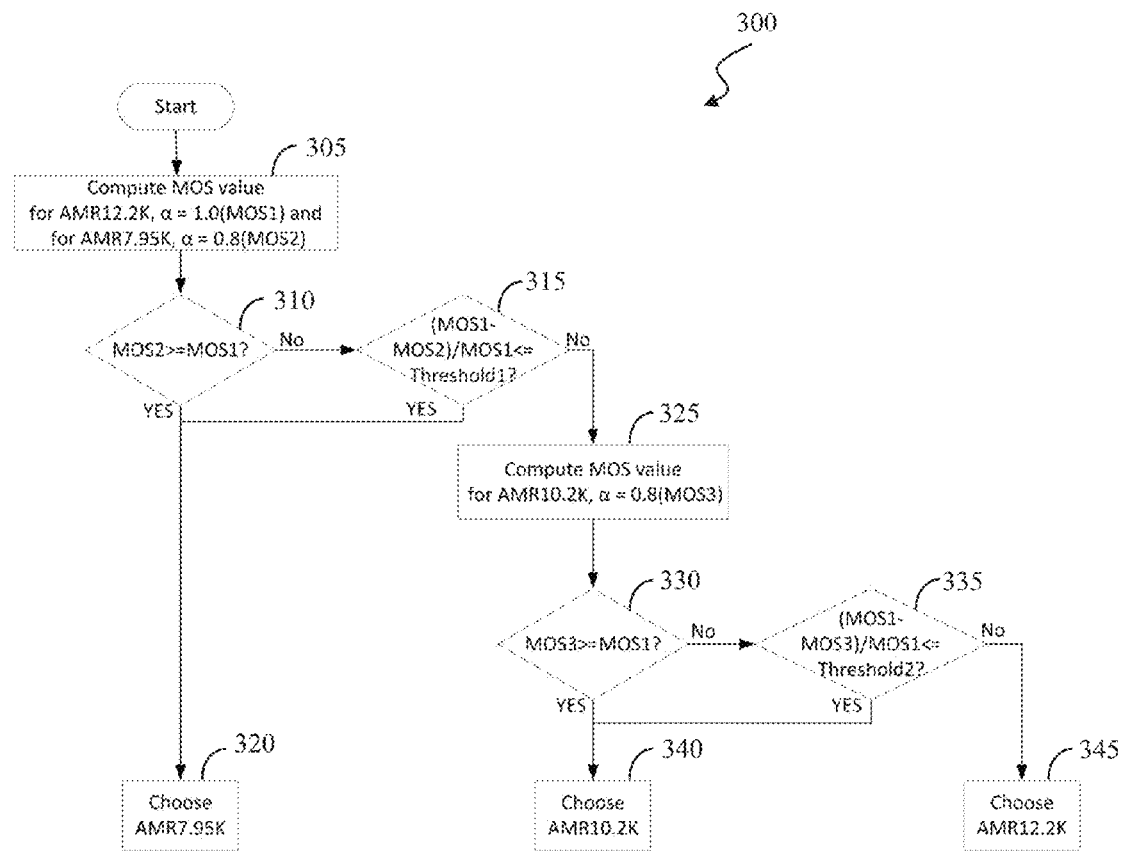
FIG. 3 is a flow diagram illustrating the AMR mode adaption workflow, in accordance with an embodiment of the invention.

In a particular embodiment, illustrating the main idea of user-specific QoS capacity improvement scheduling, three AMR modes (i.e., AMR 12.2K, 10.2K and 7.95K) are considered, while it is to be understood that the extension to other AMR modes is within the scope of the present invention. With reference to FIG. 3, the method of the AMR mode adaptation 300 begins with AMR 12.2K. The method continues by computing a first MOS value and a second MOS value 305, wherein a first MOS value is computed for AMR 12.1K and α=1.0, and a second MOS value is computer for AMR 7.95K α=0.8. The thresholds to degrade the AMR mode can be configured to control the desired MOS levels. In the exemplary embodiment, the threshold is set to 0.02, that is, the AMR mode will be degraded if the MOS is decreased by less than 0.02, compared with that of the MOS value for the non-degraded AMR mode with α=1.0. The input to the AMR mode adaptation is the packet loss ratio, while assuming an average end-to-end delay of 150 ms. After the first MOS value and the second MOS value have been computed at 305, the first MOS value is compared to the second MOS value to determine whether or not the second MOS value is greater than, or equal to, the first MOS value at 310. If the second MOS value is greater than, or equal to, the first MOS value, then the AMR mode is changed to 7.95K at 320. Alternatively, if the second MOS value is not greater than, or equal to, the first MOS value, then it is determined if the ratio of the difference between the first MOS value and the second MOS value over the first MOS value is less than, or equal to, the threshold value at 315. If the ratio exceeds the threshold value, then the AMR mode is changed to 7.95K at 320. Alternatively, if the ratio does not exceed the threshold value, then a third MOS value is computed for an AMR of 10.2K and α=0.8 at 325. The third MOS value is then compared to the first MOS value at 330, and if the third MOS value is greater than, or equal to, the first MOS value, then the AMR is changed to 10.2K at 340. Alternatively, if the third MOS value is not greater than, or equal to, the first MOS value, then it is determined if the ratio of the difference between the first MOS value and the third MOS value over the first MOS value is less than, or equal to, the threshold value at 335. If the ratio exceeds the threshold value, then the AMR mode is changed to 10.2K at 340. Alternatively, if the ratio does not exceed the threshold value, then the AMR remains at 12.2K at 345.

For video applications, regarding the determination of the UE-specific video MOS, to reflect user sensitivity to the data rate, a UE specific sensitivity factor γ is added to (5), and it becomes:

$$\text{MSE}=D_S+D_L=\gamma \cdot \eta \cdot R^\xi + \beta \cdot PEP \quad (11)$$

When γ takes the value 1, the user is considered to be a normal user. When γ takes the value greater than 1, the user is considered to be more sensitive to the data rate compared with a normal user. When γ takes the value less than 1, the user is considered to be less sensitive to the data rate as compared with a normal user. A user with a lower sensitivity factor and a lower data rate can achieve a higher MOS value than a user with a normal sensitivity factor or higher sensitivity factor and a higher data rate. If the application-aware scheduler knows and makes use of this UE specific sensitivity factor information to optimize the scheduling, it can decrease the data rate for users with a lower sensitivity factor to support more users with an acceptable MOS value. The following description provides further details.

Figure 4:
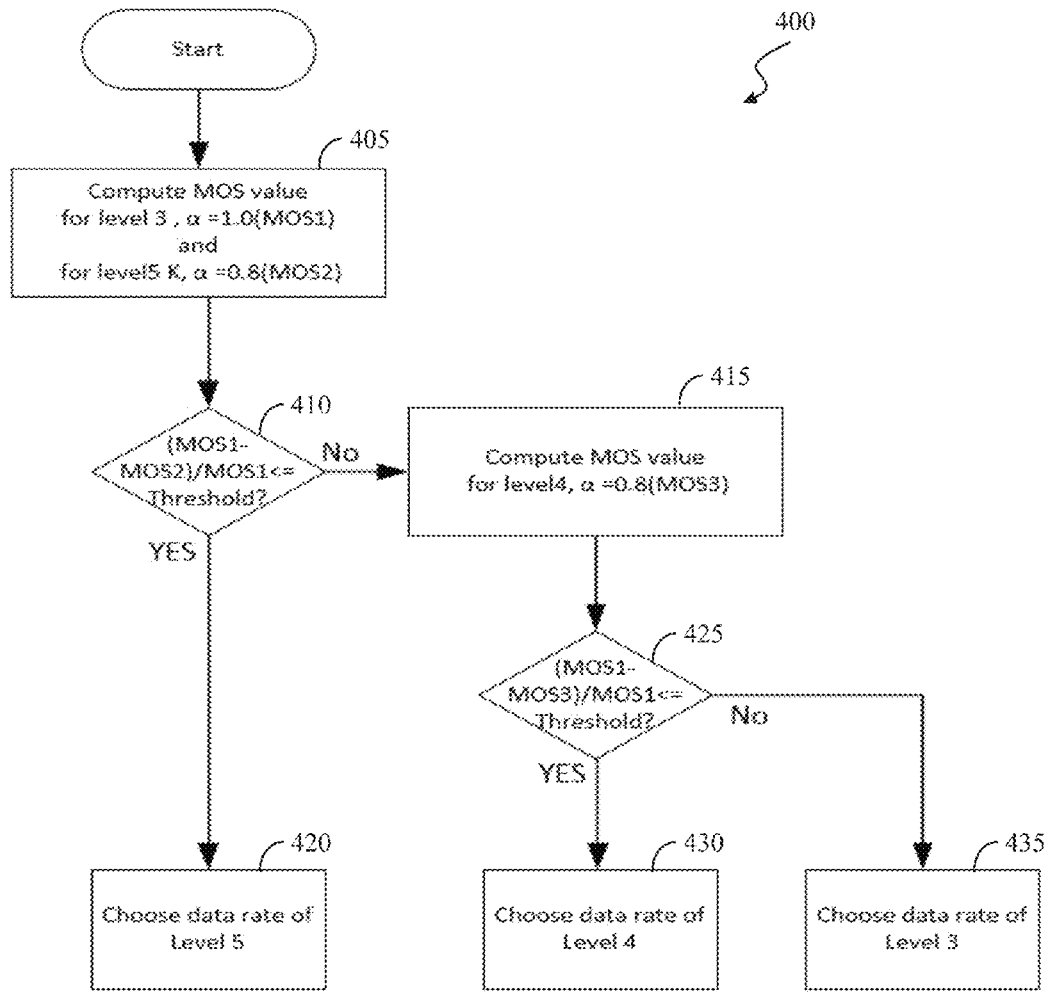
FIG. 4 is a flow diagram illustrating the data rate adaptation workflow, in accordance with an embodiment of the invention.

In an exemplary embodiment of the video rate adaptation of the present invention, for simplicity, 10 levels of data rate are defined, which loosely correspond to the application requirements, in order to illustrate the main idea of the algorithms. For Level I (1, 2, . . . , 101, the corresponding data rate is 135*128 pixels*(11−I) frames/s*8 bytes/pixel. The workflow of the video data rate adaptation is shown in FIG. 4. For simplicity of illustration, three levels of data rate are assumed in the video data rate adaptation.

With reference to FIG. 4, the workflow of the video data rate adaptation 400 begins by computing a first MOS value for a data rate level 3 and α=1.0 and a second MOS value for a data rate level 5 and α=0.8 at 405. After the first MOS value and the second MOS value have been calculated, the method continues by calculating the ratio of the difference between the first MOS value and the second MOS value over the first MOS value and determining if the calculated ratio is less than, or equal to, the threshold value at 410. If the ratio is less than, or equal to, the threshold value, then the data rate is chosen as level 5 at 420. Alternatively, if the ratio is not less than, or equal to, the threshold value, then a third MOS value for a data rate level 4 and α=0.8 is computed at 415. The method continues by calculating the ratio of the difference between the first MOS value and the third MOS value over the first MOS value and determining if the calculated ratio is less than, or equal to, the threshold value at 425. If the ratio is less than, or equal to, the threshold value, then the data rate is chosen as level 4 at 430. Alternatively, if the ratio is not less than, or equal to, the threshold value at 425, then the data rate is chosen as level 3 at 435.

The video data rate level to be selected depends upon the respectively calculated MOS for each level of data rate. Similar to VoIP users, the threshold to degrade the video data rate can be configured to control the desired MOS levels. In this exemplary embodiment, it is set to 0, which means that theoretically the MOS of degraded users will not be decreased.

With regard to the MAC resource scheduling methodology and the time domain scheduler, the same metric is applied as the LTE baseline scheduler except that $TW_k=1/0.2$ for VoIP degraded users and $TW_k=1$ in other cases. Additionally, with regard to the frequency domain scheduler, the same metric is applied as the LTE baseline scheduler except that $FW_{n,k}=10$ for VoIP degraded users for their respective best sub-band and $FW_{n,k}=1$ in other cases.

Figure 5:
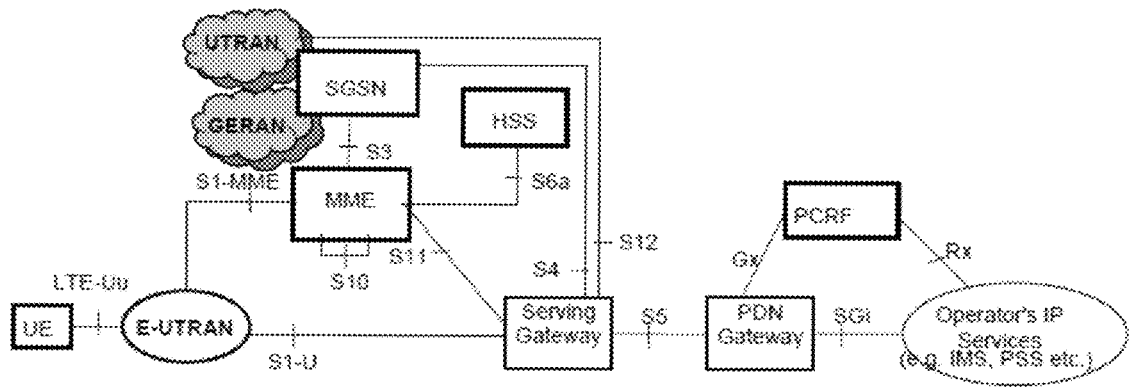
FIG. 5 is a block diagram illustrating an LTE network architecture, in accordance with an embodiment of the invention.

The LTE network architecture (non-roaming) including the network elements and the standardized interfaces is presented in FIG. 5. The LTE network is comprised of the EPC (Evolved Packet Core) and the E-UTRAN (Evolved Universal Terrestrial Radio Access Network). The EPC consists of many logical nodes, including S-GW (Serving Gateway), PDN-GW (PDN Gateway), MME (Mobility Management Entity) and PCRF (Policy and Charging Rules Function), etc. The E-UTRAN is comprises the eNodeB (evolved NodeB). Each of these network elements is interconnected by means of standardized interfaces (e.g., Rx, Gx, S5, S11 and S1-MME).

Figure 6:
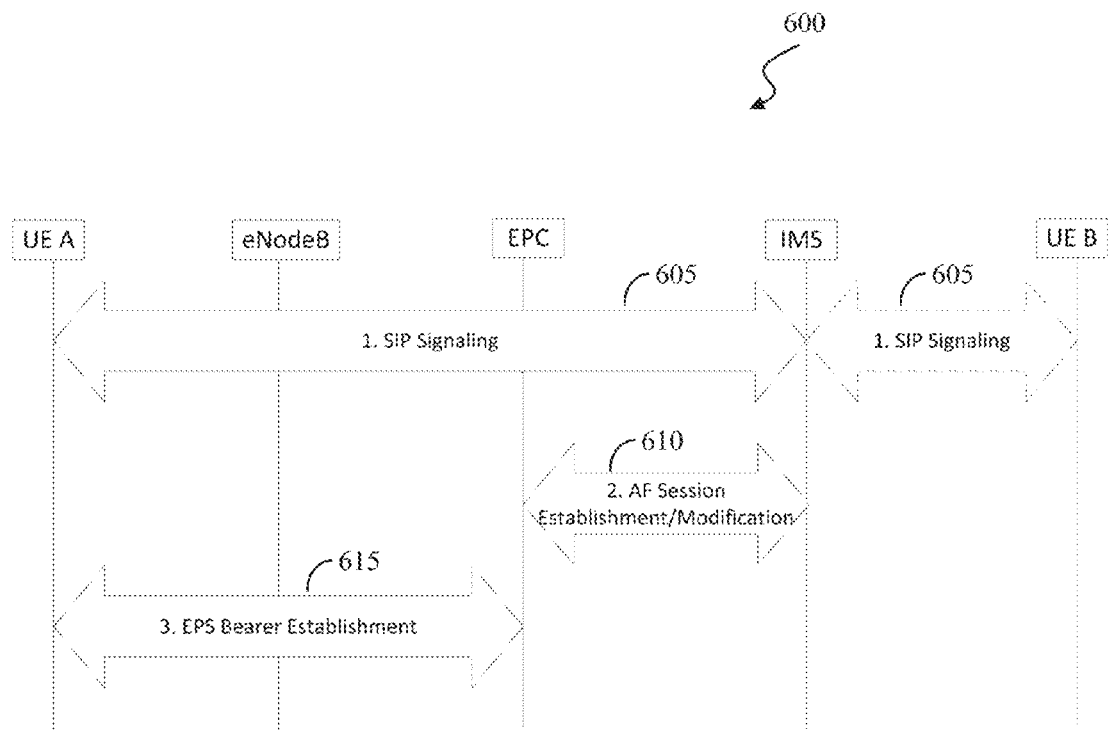
FIG. 6 is a block diagram illustrating LTE end-to-end procedures, in accordance with an embodiment of the invention.

LTE end-to-end QoS-related procedures are shown with reference to FIG. 6. These LTE end-to-end procedures 600 are composed of three major functions: (1) SIP signaling 605, (2) AF (Application Function, e.g., IMS (IP Multimedia Subsystem) session establishment/modification 610, and (3) EPS bearer establishment 615.

Several LTE QoS related protocol are incorporated with the present invention. The SIP protocol 605 is used to create, modify and terminate sessions such as Internet multimedia conferences and Internet telephone calls. It uses the SDP (Session Description Protocol) to describe a session. The Diameter base protocol provides an Authentication. Authorization and Accounting (AAA) framework for applications such as network access or IP mobility. The control planes of the GPRS Tunneling Protocol (GTP) are responsible for creating, maintaining and deleting tunnels on Sx (e.g., S5, S11) interfaces. The SI-AP protocol provides the signaling service between the E-UTRAN and the EPC.

In operation, the AF can map from SDP within the AF session signaling to Service Information passed to the PCRF over the Rx interface. The PCRF maps messages from the Service Information received over the Rx interface to the Authorized IP QoS parameters that are passed to the PCEF (Policy and Charging Enforcement Function) in the PDF-GW via the Gx interface. The PCEF maps messages from the Authorized IP QoS parameters received from the PCRF to the access specific QoS parameters, which are the QoS parameters that the MAC layer can access.

There are two methods that can be used to acquire the user-specific QoS parameters to be used by the user-specific QoS aware MAC schedulers of the present invention. The first method is to obtain the user-specific QoS parameters dynamically through the signaling messages (i.e., SIP, Diameter protocol, etc.) that are delivered to the MAC layer. The second method is to acquire the user-specific QoS parameters through the SPR (Subscriber Profile Repository) database in the PCRF that are delivered to the MAC layer. The difference between these two methods is in how the PCRF obtains the user-specific QoS parameters. After the PCRF acquires the QoS parameters, the subsequent procedures will be the same so that the pertinent QoS parameters are conveyed to the MAC layer.

For the first method, the user-specific QoS parameters are obtained by the PCRF through signaling from the SIP and Rx interface protocols.

For the second method, no special SIP signaling is required before the PCRF sends the QoS parameters further to the PCEF through the Gx interface. In most commercial systems, the network operator can obtain the user-specific QoS requirements that are based primarily upon age. When users subscribe to a service from the network operation, they often provide their relevant information, such as age and name, which can be used by the network to derive the user-specific QoS parameters. To be more specific, when a bearer is to be established or modified, the PCRF inquires of the SPR database about the relevant information of this user. If the relevant information shows that this user is older than a given age (e.g., 55), this user may be considered as a user with a lower sensitivity factor, otherwise, the user is regarded as a normal user.

Figure 7:
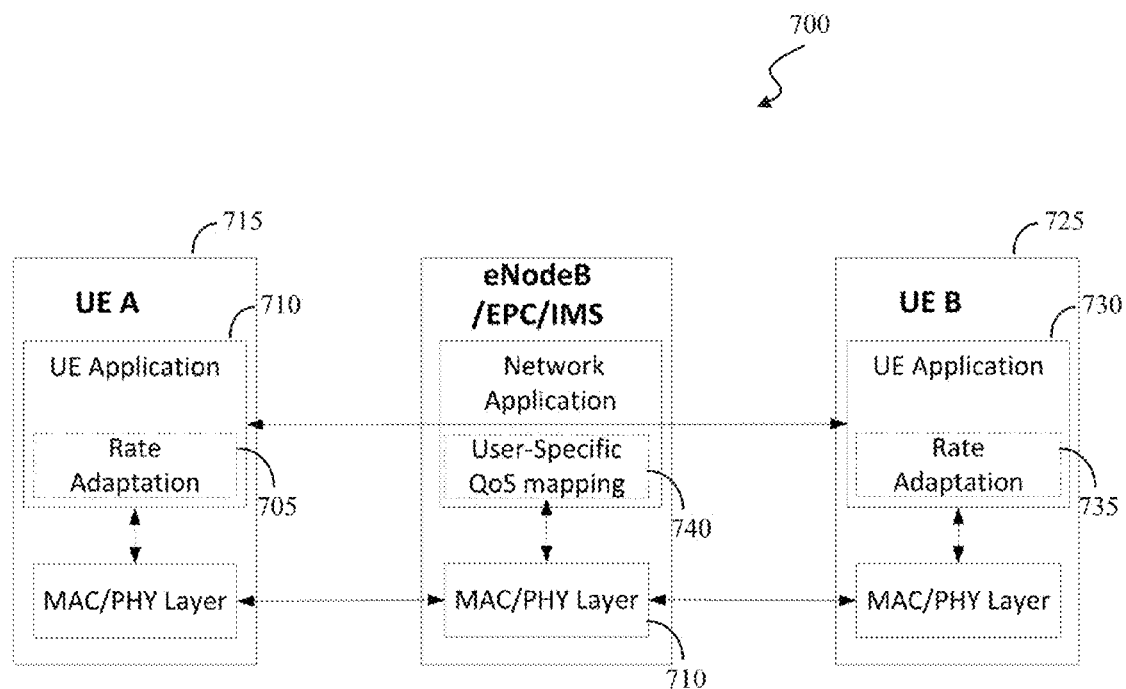
FIG. 7 is a block diagram illustrating the system architecture and interfaces based on the LTE system, in accordance with an embodiment of the invention.

The system architecture and interfaces based on the LTE system 700 are illustrated in FIG. 7, where only relevant modules are shown. In order to implement the user-specific QoS aware schedulers of the present invention, the AMR mode adaptation algorithm is implemented in the Rate Adaptation Module 705, 735 and the user-specific MAC scheduling algorithms are implemented in the eNodeB MAC layer 710.

In an exemplary embodiment of the optimization process in accordance with the present invention, when a voice session is to be initialized through the SIP protocol, the sender 715 UE application 720 and the receiver 725 UE application 730 will negotiate with each other the application level QoS parameters such as supported AMR codec modes through the IMS. User-specific QoS parameters could also be sent to the IMS by the UE 715, 720. Next, user-specific QoS requirements will be mapped from the subscription database in the network 740 (e.g., SPR), or user-specific QoS parameters will be obtained from the UEs 715, 725 during session initiation, as previously described. The user-specific QoS parameters will be delivered to the MAC/PHY Layer 710 in the eNodeB by the EPC/IMS and used to perform the user-specific QoS aware scheduling.

Due to the changing channel environment for each user and varying network condition, the optimization process implemented by the user-specific QoS schedulers should be dynamic and periodic to achieve the maximum system performance gain.

Based upon the analysis above, the following protocol adaptation is proposed to support the user-specific QoS aware scheduling. As described above, the Gx, S5/S11 and S1-MME interface protocols need to be adapted for the user-specific QoS parameters acquisition method utilizing the SPR database. Moreover, the RTCP protocol that is used to convey the rate control command also needs to be analyzed to support the user-specific QoS aware scheduling.

When dynamic user-specific QoS information needs to be conveyed from the UE to the IMS, the SIP protocol needs to be adapted accordingly. The body of an SIP message contains a description of the session, encoded in SDP. An SDP session description consists of a session-level section followed by zero or more media-level sessions. Each media-level section starts with an "m=" line. The "m=" line is defined as follows:

m=<media> <port> <proto> <fmt>, wherein

<media> is the media type. Currently, defined media are "audio", "video", "text", "application" and "message".

So, if user-specific QoS requirements need to be conveyed from the UE to the IMS, one method is to implicitly convey the user-specific QoS requirements through the media type field. A user-specific "audio" type can be added and defined, e.g., 100 indicates the user-specific audio media type with a lower sensitivity factor, and 200 indicates the user-specific audio media type with a higher sensitivity factor as described with reference to the table in FIG. 8. If new media types are defined this way, correspondingly, in the network and the peer UE, the media type field need to be parsed differently.

When an adapted data rate mode need to be signaled from the receiver UE to the sender UE, an RTCP protocol will be used. The current RTCP protocol supports the rate adaptation signaling, so it can be reused without any modification.

The Media-Component-Description AVP (Attribute Value Pair) is conveyed in the Diameter AAR message and it contains Service Information for a single media component within an AF session. If the user-specific QoS parameters need to be conveyed from the UE, the Media-Component-Description AVP can be used to convey the user-specific QoS requirements as previously described by the SIP protocol. Similarly, the PCRF needs to parse the media-type field differently accordingly to the table of FIG. 8.

The PCRF may provide authorized QoS information to the PCEF after using the mapping rules to map the Service Information to the authorized QoS information. The authorized QoS information shall be provisioned with a CCA or RAR Diameter message as QoS Information AVP. The provisioning of the authorized QoS (which is composed of QCI, ARP and bitrates) is performed from the PCRF to the PCEF.

In the PCRF, the QCI field needs to be derived based upon the SPR database or the Service Information obtained from the AF through the Rx interface. If the user-specific QoS information is conveyed from the Rx interface, the PCRF can derive the QCI value according to the media type field in the Service Information. If the user-specific QoS information is not conveyed from the Rx interface, the PCRF can use the data from the SPR database to derive the user-specific QoS parameters as previously described. Specifically, since the QCI values 0, 10-64, 67-68 and 71-255 are reserved for future use, the basic QCI value (i.e., the QCI value derived when no user specific QoS requirements are considered) plus 100 can be used to denote the user-specific QoS with a lower sensitivity factor, while the basic QCI value plu2 200 can be used to denote the user-specific QoS with a higher sensitivity factor. The mapping from the user-specific QoS information to the QCI value for the VoIP is shown with reference to the table of FIG. 9.

The Create Bearer Request message shall be sent on the S5 interface by the PDN-GW to the S-GW and on the S11 interface by the S-GW to the MME as part of the EPS Bearer establishment procedure. The Bearer Quality of Service (Bearer QoS) is transferred via GTP tunnels through the Create Bearer Request message, where the QCI field has been redefined and added additional user specific QoS values as previously described on the Gx interface, the QCI doesn't need any further modification except different parsing according to the table of FIG. 9, in the respective protocols. The PDN-GW and S-GW only need to forward the Bearer QoS information to the subsequent nodes of S-GW and MME, respectively.

The E-RAB Setup Request Message is sent by the MME to request the eNodeB to assign resources on UE and S1 interfaces for one or several E-RABs. The E-RAB Level QoS parameters are conveyed in the E-RAB Setup Request Message, where the QCI has been redefined and added additional user-specific QoS information as previously described on the Gx interface. This message doesn't need any further modification except different parsing according to the table of FIG. 9 in the respective protocol. Finally, the MAC layer can make the user of this user-specific QoS information perform a more advanced resource scheduling, i.e., user-specific QoS aware scheduling.

It is assumed that the scheduling period of the rate adaptation algorithms is the frame period of applications, that is, 20 ms for VoIP AMR applications. It is necessary to explore what the system capacity gain will be if the scheduling period is increased in a tradeoff for the reduced complexity. To illustrate the invention, a system simulation was run using the OPNET 17.5 Modeler with the LTE modules. The system simulation configuration is partly based upon LTE macrocell system simulation baseline parameters as shown in the table of FIG. 10. The simulation was performed to evaluate the downlink scheduling, with an ideal uplink receiver.

Four cases were simulated as described in the table of FIG. 11. Cases 1 and 2 are used to evaluate the performance of the USQA-M and USQA-MC schedulers, respectively, where 54 VoIP users have differently sensitivity factors $\alpha$ (18 users' $\alpha$=0.08, 18 users' $\alpha$=1.0, 18 users' $\alpha$=1.2) The USQA-M scheduler performs optimization utilizing scheduling adjustments only and the USQA-MA scheduler performs optimization utilizing both scheduling and data rate adjustments. Cases 3-4 are used to test the scheduling period for cases of vehicular speeds of 30 km/h and 60 km/h respectively.

The downlink MAC throughput may be used to derive the approximate system capacity improvement. System capacity improvement is measured by the increase in the maximum supportable number of users by the system. A rough mapping from the downlink MAC throughput to the system capacity improvement can be done based upon:

$$\text{Capacity improvement} = \frac{1/(MAC \text{ throughtput for proposed scheduler})}{1/(MAC \text{ throughput for baseline scheduler})} - 1 \quad (12)$$

Figures 13, 14:
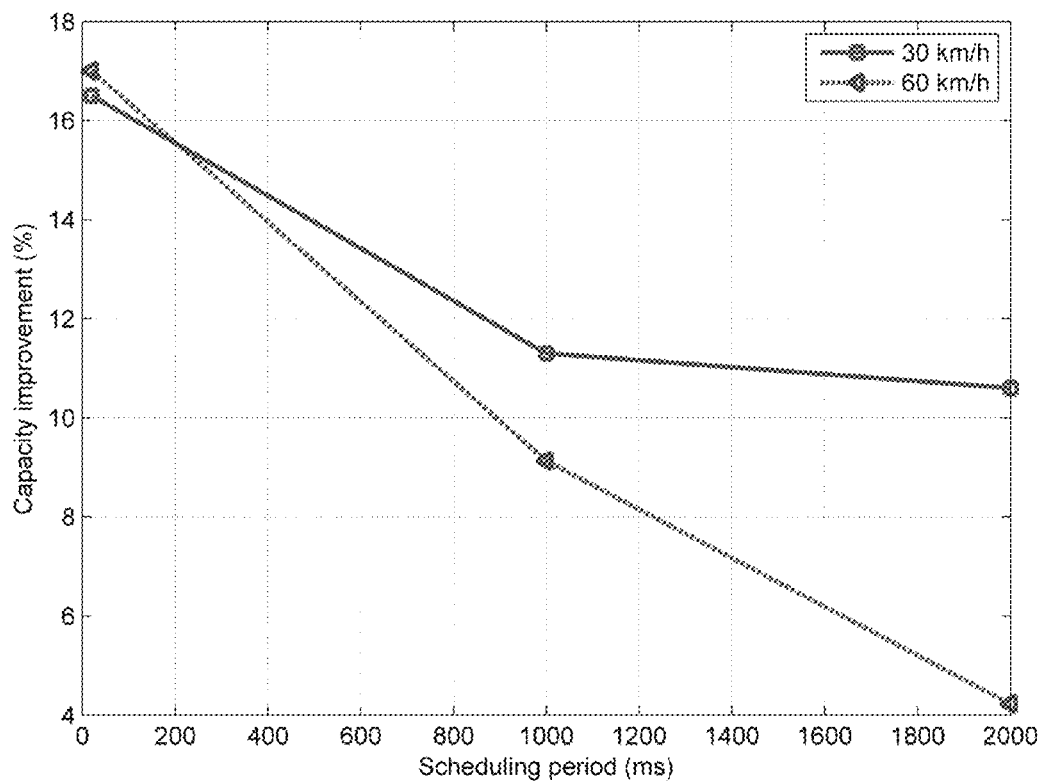
FIG. 13 is a table illustrating the system capacity comparison, in accordance with an embodiment of the invention.
FIG. 14 is graphical illustration of the VoIP capacity improvement as a function of the scheduling period, in accordance with an embodiment of the invention.

The simulation results for MOS value and capacity improvement are shown in the table of FIG. 12 and FIG. 13, respectively.

For Case 1, the average MOS of VoIP users with $\alpha$=1.2 is increased by ~9%, whereas the average MOS of VoIP users with $\alpha$=0.8 is decreased only slightly.

For Case 2, the system capacity is increased by ~4.5%, wherein the average MOS of VoIP users with $\alpha$=1.2 is increased by ~6%. The MOS gain is not as good as that of Case 1. The reason is that users with $\alpha$=0.8 are scheduled as normal users in the MAC scheduler so that they have a normal scheduling priority to compete for resources with users with $\alpha$=1.2. In this case, only ⅓ of the users have sensitivity factors of 0.8. As this ratio increases, the system capacity improvement gain will further be increased, as verified in Cases 3-4, where all users have a sensitivity factor of $\alpha$=0.8.

FIG. 14 shows the VoIP capacity as a function of scheduling period from 20 ms to 2000 ms. From FIG. 13, it is shown that as the scheduling period increases, the performance gain will decrease correspondingly. As the scheduling period increases to 100 ms, the capacity improvement will fall below 10% for the case of 60 km/h, whereas the capacity improvement is still good for the case of 30 km/h.

In accordance with the present invention, it is shown that the novel rate adaptation and MAC scheduling methodology that can significantly improve the system capacity by considering user-specific QoS requirements, while maintaining an acceptable MOS level at the same time. Two user-specific QoS aware schedulers are presented, one designed to improve the MOS and another designed to improve the MOS and the system capacity in wireless systems for VoIP. The MAC scheduler used for comparison can be easily extended to other MAC schedulers to perform a comparison with and without user-specific QoS requirements.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Python, MATLAB or the like and conventional procedural programming languages, such as the "C" programming language or similar programming languages, or assembly language.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method for user-specific quality of service (QoS) aware media access control (MAC) resource scheduling, the method comprising:

identifying one or more user-specific QoS sensitivity factors for each user of a plurality of users, each user of the plurality of users associated with a user equipment, wherein the one or more user-specific QoS sensitivity factors for each user of the plurality of users comprises at least one of a packet loss sensitivity factor that is specific to the user of the user equipment, wherein the packet loss sensitivity factor is determined at least by the age of the user and the packet loss sensitivity factor decreases as the age of the user increases, and a data rate sensitivity factor that is specific to the user of the user equipment, wherein the data rate sensitivity factor is determined at least by the age of the user and the data rate sensitivity factor decreases as the age of the user increases;

determining, at a MAC scheduler, a MAC resource scheduling priority for the user equipment associated with each user of the plurality of users based upon the one or more user-specific QoS sensitivity factors for each user of the plurality of users;

allocating, by the MAC scheduler, one or more resources to the user equipment associated with each user of the plurality of users based upon the MAC resource scheduling priority for the user equipment associated with each user of the plurality of users;

determining a data rate for the user equipment associated with each user of the plurality of users, wherein for the user equipment associated with each user of the plurality of users;

calculating a first mean opinion score (MOS) at a first data rate and a first packet loss sensitivity factor;

calculating a second MOS at a second data rate and a second packet loss sensitivity, wherein the second data rate is lower than the first data rate and the second packet loss sensitivity factor is lower than the first packet loss sensitivity factor;

comparing the first MOS to the second MOS and if the second MOS is greater than the first MOS, setting the data rate for the user equipment associated with the user to the second date rate, or if the second MOS is not greater than the first MOS, calculating a difference ratio between the first MOS and the second MOS and if the difference ratio is less than a predetermined threshold, setting the data rate for the user equipment associated with the user to the second data rate.

2. The method of claim 1, further comprising, dynamically adjusting the MAC resource scheduling priority for the user equipment associated with each user of the plurality of users based upon at least one of a channel environment for the user equipment associated with each user of the plurality of users and a network condition of the MAC scheduler.

3. The method of claim 1, further comprising, dynamically adjusting the data rate for the user equipment associated with each user of the plurality of users based upon at least one of a channel environment for the user equipment associated with each user of the plurality of users and a network condition of the MAC scheduler.

4. The method of claim 1, wherein determining a data rate for the user equipment associated with each user of the plurality of users based upon the one or more user-specific QoS sensitivity factors for each user of the plurality of users further comprises, determining a data compression mode for the user equipment associated with each user of the plurality of users.

5. The method of claim 1, wherein determining, at a MAC scheduler, a MAC resource scheduling priority for the user equipment associated with each user of the plurality of users based upon the one or more user-specific QoS sensitivity factors for each user of the plurality of users, further comprises:

identifying, by a time domain scheduler, a subset of users of the plurality of users requesting frequency resources; and allocating, by a frequency domain scheduler, physical resources to the subset of users of the plurality of users requesting frequency resources.

6. The method of claim 1, further comprising, acquiring the one or more user-specific QoS sensitivity factors for each user of the plurality of users from one or more signaling messages received at the MAC scheduler.

7. The method of claim 1, further comprising, acquiring the one or more user-specific QoS sensitivity factors for each user of the plurality of users from a subscriber profile repository database received at the MAC scheduler.

8. The method of claim 1, wherein the one or more user-specific QoS sensitivity factors for each user of the plurality of users further comprises an application specific sensitivity factor.

9. The method of claim 1, wherein determining the data rate for the user equipment associated with each user of the plurality of users maximizes a spectrum utilization of a network comprising the user equipment.

10. An apparatus configured for operation in a wireless communication network, the apparatus comprising:
   a memory; and
   at least one processor coupled to the memory, the at least one processor being configured:
      to identify one or more user-specific QoS sensitivity factors for each user of a plurality of users, each user of the plurality of users associated with a user equipment, wherein the one or more user-specific QoS sensitivity factors for each user of the plurality of users comprises at least one of a packet loss sensitivity factor that is specific to the user of the user equipment, wherein the packet loss sensitivity factor is determined at least by the age of the user and the packet loss sensitivity factor decreases as the age of the user increases, and a data rate sensitivity factor that is specific to the user of the user equipment, wherein the data rate sensitivity factor is determined at least by the age of the user and the data rate sensitivity factor decreases as the age of the user increases;
      to determine a MAC resource scheduling priority for the user equipment associated with each user of the plurality of users based upon the one or more user-specific QoS sensitivity factors for each user of the plurality of users;
      to allocate one or more resources to the user equipment associated with each user of the plurality of users based upon the MAC resource scheduling priority for the user equipment associated with each user of the plurality of users;
      to determine a data rate for the user equipment associated with each user of the plurality of users, wherein for the user equipment associated with each user of the plurality of users;
         to calculate a first mean opinion score (MOS) at a first data rate and a first packet loss sensitivity factor;
         to calculate a second MOS at a second data rate and a second packet loss sensitivity, wherein the second data rate is lower than the first data rate and the second packet loss sensitivity factor is lower than the first packet loss sensitivity factor;
         to compare the first MOS to the second MOS and if the second MOS is greater than the first MOS, to set the data rate for the user equipment associated with the user to the second date rate, or if the second MOS is not greater than the first MOS, to calculate a difference ratio between the first MOS and the second MOS and if the difference ratio is less than a predetermined threshold, to set the data rate for the user equipment associated with the user to the second data rate.

11. The apparatus of claim 10, wherein the processor is further configured: to dynamically adjust the MAC resource scheduling priority for the user equipment associated with each user of the plurality of users based upon at least one of a channel environment for the user equipment associated with each user of the plurality of users and a network condition of the MAC scheduler; and to dynamically adjust the data rate for the user equipment associated with each user of the plurality of users based upon at least one of a channel environment for the user equipment associated with each user of the plurality of users and a network condition of the MAC scheduler.

12. The apparatus of claim 10, wherein the one or more user-specific QoS sensitivity factors for each user of the plurality of users are acquired from one or more signaling messages received at the MAC scheduler.

13. The apparatus of claim 10, wherein the one or more user-specific QoS sensitivity factors for each user of the plurality of users are acquired from a subscriber profile repository database received at the MAC scheduler.

14. A computer program product configured for wireless communication, the computer program product comprising: a computer-readable medium having non-transitory program code recorded thereon, the program code comprising:
    program code to identify one or more user-specific QoS sensitivity factors for each user of a plurality of users, each user of the plurality of users associated with a user equipment, wherein the one or more user-specific QoS sensitivity factors for each user of the plurality of users comprises at least one of a packet loss sensitivity factor that is specific to the user of the user equipment, wherein the packet loss sensitivity factor is determined at least by the age of the user and the packet loss sensitivity factor decreases as the age of the user increases, and a data rate sensitivity factor that is specific to the user of the user equipment, wherein the data rate sensitivity factor is determined at least by the age of the user and the data rate sensitivity factor decreases as the age of the user increases;
    program code to determine a MAC resource scheduling priority for the user equipment associated with each user of the plurality of users based upon the one or more user-specific QoS sensitivity factors for each user of the plurality of users; and program code to allocate one or more resources to the user equipment associated with each user of the plurality of users based upon the MAC resource scheduling priority for the user equipment associated with each user of the plurality of users;
    program code to determine a data rate for the user equipment associated with each user of the plurality of users, wherein for the user equipment associated with each user of the plurality of users, the program code to calculate a first mean opinion score (MOS) at a first data rate and a first packet loss sensitivity factor; to calculate a second MOS at a second data rate and a second packet loss sensitivity, wherein the second data rate is lower than the first data rate and the second packet loss sensitivity factor is lower than the first packet loss sensitivity factor; to compare the first MOS to the second MOS and if the second MOS is greater than the first MOS, to set the data rate for the user equipment associated with the user to the second date rate, or if the second MOS is not greater than the first MOS, to calculate a difference ratio between the first MOS and the second MOS and if the difference ratio is less than a predetermined threshold, to set the data rate for the user equipment associated with the user to the second data rate.

15. The computer program product of claim 14, wherein the computer program product further comprises: program code to dynamically adjust the MAC resource scheduling priority for the user equipment associated with each user of the plurality of users based upon at least one of a channel environment for the user equipment associated with each user of the plurality of users and a network condition of the MAC scheduler; and
    program code to dynamically adjust the data rate for the user equipment associated with each user of the plurality of users based upon at least one of a channel environment for the user equipment associated with each user of the plurality of users and a network condition of the MAC scheduler.

* * * * *